Patented Dec. 11, 1928.

1,694,831

UNITED STATES PATENT OFFICE.

FRITZ ROTHE AND HANS BRENEK, OF BERLIN, GERMANY, ASSIGNORS TO THE FIRM OF RHENANIA-KUNHEIM, VEREIN CHEMISCHER FABRIKEN, AKTIENGESELL-SCHAFT, OF BERLIN, GERMANY, A SOCIETY OF GERMANY.

PROCESS FOR THE MANUFACTURE OF GLASS CONTAINING BARIUM.

No Drawing. Application filed October 11, 1926, Serial No. 141,029, and in Germany October 16, 1925.

This invention relates to the manufacture of glass containing barium.

Such glass is characterized by a high refractive index and great hardness. Hitherto the barium has been added in the form of the carbonate which is obtained by known methods by reduction of barytes or heavy spar (barium sulphate) with carbon and conversion of the resulting barium sulphide into the carbonate.

The applicants have solved the problem of manufacturing barium glass using more suitable barium compounds which may be easily obtained from cheaper raw materials.

According to the present invention barium silicate produced directly from heavy spar is melted with the usual glass forming substances. Thus barium sulphate is converted into barium silicate instead of into barium carbonate as hitherto, providing a product which is particularly suitable for the manufacture of glass and is also very cheap for this purpose. The procedure adopted is, for example, to heat a mixture of 100 parts of finely ground heavy spar and 13 parts of finely ground quartz sand in a revolving furnace, with direct heating and at the same time introducing steam, at temperatures of about 1200°. A reaction product is obtained by this means which is easily sintered, is absolutely free from sulphuric acid, and is characterized by its high content of barium oxide (82% BaO). This is particularly suitable for use in the production of baryta glass.

In order to obtain barium glass, 100 parts of sand, 26 parts of calcined soda, 15 parts of calcium carbonate and 34 parts of the barium silicate containing 82% BaO obtained from the heavy spar are melted down in the usual manner for the preparation of glass.

The barium silicate easily dissolves in the glass melt without leaving any residue. The use of barium silicate obtained from the heavy spar has the advantages over the barium carbonate which has hitherto been used that it is cheaper to prepare and there is no objectionable evolution of carbon dioxide during the glass melting.

It is already known to manufacture barium silicate from barium oxide. Barium silicate of this type is however not suitable for the manufacture of baryta glass owing to its high price. Further the barium silicate obtained from heavy spar according to the present invention possesses properties which make it particularly suitable for the preparation of glass such as for example, the high content of BaO, ease with which it may be pulverized, etc.

We declare that what we claim is:

1. Process for the manufacture of barium glass which consists in melting barium silicate with glass-forming ingredients.

2. Process for the manufacture of barium glass which consists in melting barium silicate, containing more than 80% of barium oxide, with the usual glass forming ingredients.

3. Process for the manufacture of barium glass which consists in melting barium silicate, produced by heating heavy spar and silica in presence of steam, with the usual glass forming ingredients.

4. Process for the manufacture of barium glass which consists in melting barium silicate, produced by heating heavy spar and silica in presence of steam at a temperature above 1000° C. with the usual glass forming ingredients.

5. Process for the manufacture of barium glass which consists in melting barium silicate, produced by heating heavy spar and silica in presence of steam in a revolving furnace at a temperature above 1000° C. with the usual glass forming ingredients.

In testimony whereof we affix our signatures.

FRITZ ROTHE.
HANS BRENEK.